United States Patent [19]

Sheen et al.

[11] Patent Number: 5,286,504
[45] Date of Patent: Feb. 15, 1994

[54] MICROWAVABLE FRY-LIKE COOKING PROCESS

[75] Inventors: Shiowshuh Sheen, New Hyde Park; John Moyer, Garden City; Simon Gagel, Forest Hills, all of N.Y.

[73] Assignee: DCA Food Industries, Inc., Garden City, N.Y.

[21] Appl. No.: 12,254

[22] Filed: Feb. 1, 1993

[51] Int. Cl.⁵ .............................................. A23L 1/00
[52] U.S. Cl. .................... 426/243; 426/262; 426/305
[58] Field of Search ............... 426/243, 242, 262, 305

[56] References Cited

U.S. PATENT DOCUMENTS 4,985,261  1/1991  Kang et al. .................... 426/243

Primary Examiner—George Yeung
Attorney, Agent, or Firm—Amster, Rothstein & Ebenstein

[57] ABSTRACT

A fry-like microwave cooking process for producing food with a crisp exterior and a soft, tender interior includes the steps of applying an edible hydrophilic lossy susceptor to at least a portion of the surface of the food bearing a moisture-retardant edible barrier layer, and microwave cooking the susceptor-bearing food to provide a crisp exterior and a soft, tender interior for the food. The barrier layer is a natural skin, a dough layer or a film formed of a plasticized material selected from the group consisting of methylcellulose, carrageenan and combinations thereof. The susceptor includes glycerine, sucrose ester, and chloride salt. The susceptor is characterized by the property that 25 grams of the susceptor in a 50 ml. glass beaker is heatable to 200° C. in less than 40 seconds by 900 watts of microwave energy in a 1.1 cu. ft. oven. Preferably the process further browns and crisps the food exterior through a Maillard reaction at a temperature of at least 135° C., the susceptor additionally including a reducing sugar and an amino compound.

25 Claims, 1 Drawing Sheet

MICROWAVABLE FRY-LIKE COOKING PROCESS

BACKGROUND OF THE INVENTION

The present invention relates to a microwave cooking process which produces results similar to frying, and in particular to such a process for producing food with a crisp exterior (which is optionally browned) and a soft, tender interior.

It is well recognized that, in spite of its numerous advantages in terms of speed of cooking, the microwave cooking process cannot simulate the frying process. More particularly, the microwave process does not produce food with a crisp exterior and a soft, tender interior unless extraordinary measures are utilized, such as employing a microwave oven which includes both microwave cooking and sensible heat cooking, or the use of susceptors such as cooking containers including a metallized film or a laminated paper. "Crispiness" is defined as resistance to bite and friability (crumbliness) of the food exterior.

Conventional microwave cooking of foodstuffs having a coating—e.g., battered and breaded foodstuffs—usually results in a soggy texture at the outer surface of the food due to moisture migration from inside the foodstuff during the microwave cooking. The migrating moisture mixes with the oil of the coating at the outer food surface, the effect being to slow the heating rate down and prevent the surface temperature from exceeding 100° C. (the boiling point of water) as long as there is a high level of moisture migration from the food interior to the food exterior. When all or most of the moisture has migrated from the food interior and been evaporated from the food exterior, the outer food surface temperature can exceed 100° C.; however, by this time the foodstuff has a relatively dry and typically unappetizing interior.

One of the advantages of the frying process is the production of a naturally browned exterior, the browning process being a result of the reaction between a reducing sugar and an amino compound at a temperature of at least about 135° C. Clearly such Maillard browning cannot occur during normal microwave cooking so long as the foodstuff has a high moisture content since the outwardly migrating moisture will prevent the surface temperature from exceeding 100° C. In order to obtain the browning effect, food coatings have been used which include pre-caramelized sugar or coloring ingredients, such as paprika. These coatings have not proven to be entirely satisfactory and are generally easily detectable.

In order to make possible true Maillard browning during microwave cooking, microwave susceptors of various types have been employed, including metallized films or paper laminates. While such susceptors may increase the temperature at the food exterior sufficiently to permit the Maillard reaction to proceed, the metal and/or glue utilized in these susceptors may contaminate the foodstuff either during or after microwave cooking and thus such susceptors are not entirely satisfactory.

Accordingly, it is an object of the present invention to provide a microwave cooking process which simulates frying to produce food having a crisp exterior and a soft, tender interior.

Another object is to provide such a process which in a preferred embodiment browns the food exterior through a true Maillard reaction.

A further object is to provide such a process which is safe and economical.

SUMMARY OF THE INVENTION

It has now been found that the above and related objects of the present invention are obtained in a fry-like microwave cooking process for producing food with a crisp exterior and a soft, tender interior. The process comprises the steps of applying an edible hydrophilic lossy susceptor to at least a portion of the surface of the food bearing a moisture-retardant edible barrier layer. The susceptor includes glycerine, sucrose ester, and chloride salt, 25 grams of the susceptor in a 50 ml. glass beaker being heatable to 200° C. in less than 40 seconds by 900 watts of microwave energy in a 1.1 cu. ft. oven. Finally, the susceptor-bearing food is microwave cooked to provide a crisp exterior and a soft, tender interior for the food.

In a preferred embodiment, the process further browns and crisps the food exterior through a Maillard reaction at a temperature of at least 135° C., the susceptor additionally including a reducing sugar and an amino compound. Preferably the reducing sugar is selected from the group consisting of dextrose, fructose, galactose, and combinations thereof, and the amino compound is an amino acid selected from the group consisting of lysine, glutaminic acid, cystine, and combinations thereof.

Preferably the food initially has a moisture content of at least 45% by weight. The barrier layer is a natural skin, a dough layer, an applied barrier film formed of a plasticized material selected from the group consisting of methylcellulose, carrageenan and combinations thereof, or a combination thereof. The barrier film is applied to a thickness of 20-50 microns. The microwave cooking of the susceptor-bearing food eventually causes visual disappearance of the barrier film. However, the barrier film protects the susceptor from the moisture escaping the food during microwave cooking for sufficient time for the susceptor temperature to reach the Maillard reaction temperature.

Regarding the susceptor, preferably the susceptor is applied to the barrier-bearing surface by spraying or painting and may include a viscosity adjuster. The chloride salt is selected from the group consisting of sodium chloride and potassium chloride, and combination thereof, and the sucrose ester is selected from the group consisting of behenate, stearate, oleate, palmitate, myristate, and laurate esters and combinations thereof. Preferably the susceptor includes 2-10% sucrose ester and less than 4% chloride salt, based on the weight of the susceptor. The susceptor may additionally include an acidic polysaccharide gum selected from the group consisting of Karaya gum, Ghatti gum, Tragacanth gum and combinations thereof, preferably 4-8% acidic polysaccharide gum, based on the weight of the susceptor. The susceptor may additionally include a viscosity modifier selected from the group consisting of gelatin, pectin, sodium carboxymethylcellulose, and combinations thereof, thereby to provide a desirable viscosity for application of the susceptor.

The barrier layer typically covers at least 10% of the food surface, and the susceptor preferably substantially covers the barrier-bearing food surface.

BRIEF DESCRIPTION OF THE DRAWING

The above brief description of the present invention, along with other features, objects, and advantages thereof, will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
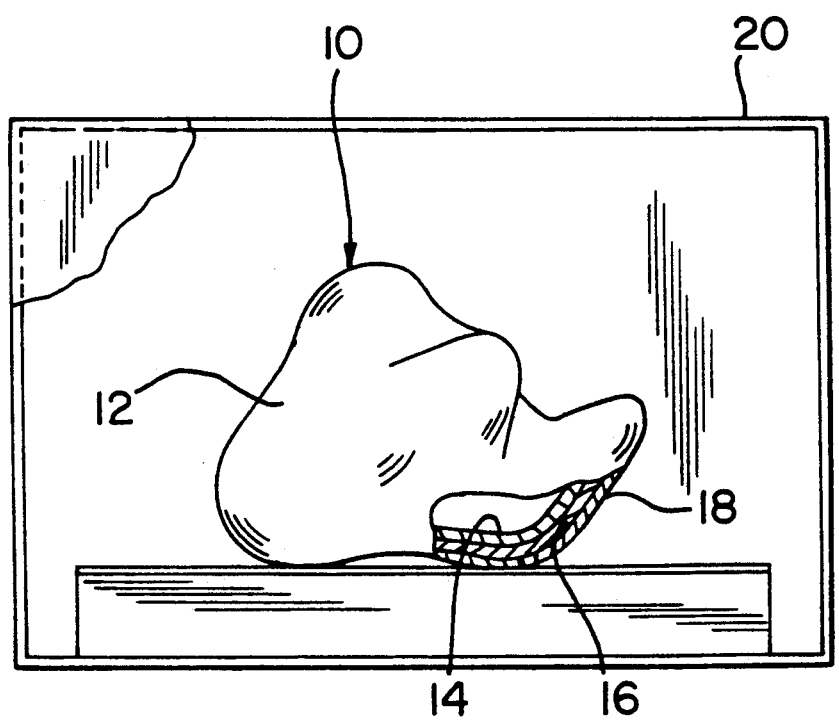
FIG. 1 is a side elevational view of a foodstuff prepared according to the present invention, with portions thereof being removed to reveal details of internal construction.

Referring now to the drawing, and in particular to FIG. 1 thereof, therein illustrated is a food, generally designated by the reference numeral 10, prepared according to the present invention. The illustrated food 10 has a crisp, naturally browned exterior 12 and a soft, tender interior 14. Suitable foods for the practice of the present invention include poultry (e.g., chicken breast, thigh, etc.), potatoes, beef, meat pie (i.e., dough-enrobed ground meat), and the like.

The process of the present invention comprises the steps of applying an edible, hydrophilic lossy susceptor 18 to at least a portion of the surface of the food 10 bearing a moisture-retardant edible barrier layer 16, and then cooking the susceptor-bearing food in a microwave oven 20 to provide a crisp exterior 12 and a soft, tender interior 14 for the food. It will be appreciated that the barrier layer need not cover the entire surface of the food, although it preferably covers at least 10% of the surface thereof. Similarly, the susceptor need not be applied to the entirety of the barrier-bearing surface of the food, although for practical and economical reasons the susceptor is preferably applied to substantially all of an applied barrier surface, as otherwise the relatively expensive barrier film which is not covered by the susceptor is being wasted.

The food which is treated according to the present invention preferably has a moisture content of at least 45% by weight prior to application of the barrier film. A high moisture content may be the result of the natural moisture content of the food, or the result of a "moisture gain" step in the processing which precedes the application of the barrier film. Thus the moisture content of the food may be enhanced through conventional tumbling, soaking, injecting or like processes for increasing the moisture content or by the "moisture gain" step described in commonly-owned copending U.S. patent application Ser. No. 07/986,676, filed Dec. 8, 1992.

That application describes a process for preparing a coated microwaveable meat which will be juicy and tender after microwave cooking. The meat is intimately contacted with an aqueous solution having a pH of 5.0–9.0 and a cation normality ratio of $Na^+/D^+/Ca^{++}$ of 2-10/1-6/1-4, the contact continuing until the water gain in the meat is at least 8% of the initial weight of the meat. Thereafter a dry, powdery coating agent, including starch, protein and optional flavoring, is applied to the meat. During subsequent microwave cooking of the meat, the coating agent forms a starch-and-protein crosslinked continuous skin-like film which controls the heating rate and the microwave penetration depth so that microwave energy absorption is at least initially higher at the film than in the interior of the meat. For the purposes of the present invention, a preferred coating agent is by weight:

| Fructose | 30.0 |
| --- | --- |
| Sodium Chloride | 15.0 |
| Rice Flour | 15.0 |
| Pre-gelled Starch | 6.0 |
| Isolated Soy Protein | 9.0 |
| Egg Albumen | 15.0 |
| Soy Sauce Powder | 3.0 |
| Spice Blend | 5.5 |
| Paprika | 1.5 |

The barrier layer may be an applied film formed of a plasticized material selected from the group consisting of methylcellulose, carrageenan and combinations thereof, the material being plasticized to enhance its flexibility. The barrier film is typically applied to a thickness of about 10–100 microns, and preferably 20–50 microns. The barrier film thus formed typically dissolves at about 20–80° C.

Surprisingly, it has been found that various natural moisture-retardant edible barrier layers serve the same purpose as the applied moisture-retardant edible barrier film. Thus, it has been found that a natural skin (for example, the skin of chicken) serves as a natural moisture-retardant edible barrier layer. The natural skin barrier layer enables excellent browning to be obtained, although the crispness of the exterior is frequently not as high as might be desired. It was also found that the raw dough (even without breading and without pre-frying) used on various food pies (wherein a raw dough sheet is used to enrobe ground foods such as beef, chicken, salad or the like) also serves as a satisfactory moisture-retardant edible barrier layer. The enrobing dough may be composed of one, two or more layers, depending upon the particular product. Thus, the food according to the present invention bears a moisture-retardant edible barrier layer which may be a natural skin, a dough layer, an applied film or a combination thereof.

During the microwave cooking of the food, some of the moisture from the food interior will migrate outwardly to the food exterior. It is believed that, as the hot moisture vapor contacts and heats the barrier film, the barrier film first becomes invisible (that is, visually disappears) and then, in most cases, dissolves in the moisture. Nonetheless, the barrier film, during the brief time that it is in existence, provides the critical function of protecting the susceptor (to be discussed hereinafter) from the moisture escaping the food during microwave cooking for sufficient time for the susceptor to have its desired effect, generally to reach the Maillard reaction temperature. The film is placed on an exterior surface of the food, generally a top surface, by any suitable means.

After any barrier film has been applied to a portion of the food surface, preferably at least 10% thereof, an edible hydrophilic lossy susceptor is applied to at least a portion of the barrier-bearing surface of the food, and typically all of the film-bearing surface. The susceptor is typically applied to the barrier-bearing surface by spraying or painting, although other conventional techniques for applying similar materials to a barrier-bearing surface may be employed.

The susceptor is a semi-liquid lossy material including glycerine, sucrose ester, and chloride salt and is characterized by the property that 25 grams thereof in a 50 milliliter glass beaker is heatable to at least 200° C. within 40 seconds by 900 watts of microwave energy in a 1.1 cubic foot oven. The 900 watt 1.1 cubic foot oven represents the capacity of a common household microwave oven, 40 seconds represents a satisfactorily short microwave cook time, and 200° C. provides sufficient sensible heat for general susceptor purposes, including browning. In other words, the lossy material should enable the food to achieve a surface temperature of at least 135° C. in the microwave cooking process. For comparative purposes, glycerine by itself as a lossy material, under the test conditions noted above, is heatable to only 160° C. within 40 seconds.

Preferably the sucrose ester is selected from the group consisting of behenate, stearate, oleate, palmitate, myristate, and laurate esters and combinations thereof, although other sucrose esters may also be used. Preferably the lossy material includes 2%–10% of the sucrose ester, based on the weight of the lossy material. It has been found that the presence of the sucrose ester increases the heating rate of the glycerine substantially.

The chloride salt is preferably selected from the group consisting of sodium chloride, potassium chloride, and combinations thereof. Although the potassium chloride is not very palatable, its presence in small quantities is acceptable. Preferably the lossy material includes less than 4% chloride salt, based on the weight of the lossy material, although greater levels may be used if desired, especially for the added flavor.

Heating rates were determined by heating 25 grams of the lossy material in a 50 ml. glass beaker heated using a 900 watt, 1.1 cubic foot household microwave oven—namely, the "Quasar" MQS 1103 oven available from Panasonic. The temperature uniformity of the 25 gram sample domain was found in the range of a 2° C. variance measured by optic fiber probes at three different locations inside the beaker. The heating rate was calculated as the linear temperature rise in the first 30 seconds of heating (i.e., the difference between the initial temperature and the temperature at the end of the 30 seconds, divided by 30). The increases in heating rate are reported as percentage increases over the 3.95° C./sec heating rate of glycerine by itself. Percentage additive levels are based on the weight of the lossy material.

The presence of sucrose ester at the 2%, 4%, 6%, 8% and 10% levels in the glycerine increases the heating rate of glycerine by 5.8, 10.6, 21.5, 16.5 and 38.2%. (The apparent discrepancy in the data at the 8% sucrose ester level is probably due to the increase in viscosity at this level and subsequent uneven heating in a small beaker.) The presence of sodium chloride at the 2% level in the glycerine increases the heating rate of glycerine by 16.5%, while higher NaCl levels (up to 10%) did not show any further improvement in the heating rate and indeed some levels showed a decrease in the heating rate from the 2% level. Nonetheless, an NaCl level of about 4% is preferred for the taste produced thereby. Combinations of the sucrose ester and the chloride salt were particularly effective in increasing the heating rate of glycerine alone. Thus, for a lossy material containing glycerine and 2% sodium chloride salt, as the sucrose ester level was raised from 2% to 4% to 6%, the heating rate increased from 15.4% to 45.5% to 54.4%, respectively. Accordingly, the combination of these ingredients is especially preferred for their high effectiveness, lower cost, and recognized safety as food-grade (edible) materials.

The improvements in heating rate noted above through the use of the sucrose ester and chloride salt additives are specific to the use of glycerine as the solvent or carrier for the additives. No significant improvement in the microwave heating rate was noted where the solvent or carrier was propylene glycol and, in any case, propylene glycol is not particularly palatable, even though edible.

In addition to the sucrose ester and chloride salt, the lossy material may also include a lossiness enhancer such as an edible acidic polysaccharide gum. The acidic polysaccharide gum is preferably selected from the group consisting of Karaya gum, Ghatti gum, Tragacanth gum, and combinations thereof. At the 4% level the Karaya, Ghatti and Tragacanth gums resulted in increases of 38.1%, 43.3% and 36.7%, respectively, while at the 8% level the same gums resulted in increased heating rates of 47.3%, 49.3% and 54.1%, respectively. While the aforenoted gums at the 4% and 8% levels produced substantial increases in the heating rate of glycerine alone, Tragacanth gums also tend to result in gelling of the lossy material, and thus uneven heating by the susceptor, and therefore must be used with caution to avoid local burning effects.

In order to provide a desirable viscosity for application of the lossy material, the lossy material may additionally include an edible viscosity modifier. While any of the known edible viscosity modifiers which do not adversely affect the lossy material with regard to its lossy properties may be used, preferred viscosity modifiers include gelatin, pectin, Na-CMC, and combinations thereof. A preferred viscosity is 8,000–14,000 cps (optimally 9,000–14,000 cps) measured using a Brookfield "Synchro-Lectric" Viscometer Model LVF with probe No. 4 and 12 rpm at 20° C.

Where, as is typically the case, it is desired to brown the food exterior through a Maillard reaction, the susceptor additionally includes a reducing sugar and an amino compound. While the various reducing sugars and the various amino compounds utilizable in the Maillard reaction are well known to those skilled in the food art and may be employed in the present invention, preferably the reducing sugar is selected from the group consisting of dextrose, fructose, galactose and combinations thereof and is present at a level of 5 to 20%, while preferably the amino compound is an amino acid selected from the group consisting of lysine, glutaminic acid, cystine and combinations thereof and is present at a level of 1 to 15%, based on the weight of the lossy material.

The amino acid is most economically obtained as a protein hydrolysate (such as a milk protein hydrolysate), the hydrolysate including a mixture of various amino acids as well as dipeptides and small polypeptides. (Depending upon the particular application, it may be preferred to use the pure amino acids rather than a hydrolysate. For example, milk protein hydrolysate has not been found to be very effective on skinless chicken breasts having an edible barrier film thereon, whereas lysine (a pure amino acid) is very effective thereon.)

Because the susceptor itself contains the reagents which produce browning, the agents themselves are at the susceptor temperature and available to undergo the Maillard reaction as soon as the susceptor temperature reaches the Maillard reaction temperature (about 135° C.). (This is a vast improvement over the use of an external susceptor, with which there is typically an air gap intermediate the susceptor and a substantial portion of the food surface containing the browning reagents, so that the susceptor must be heated to a substantially higher temperature than the Maillard reaction temperature if all the browning reagents are to be heated to the Maillard reaction temperature.) The susceptor may also include conventional flavoring ingredients.

Alternatively, the browning reactants—that is, the amino compound and the reducing sugar—may be applied (either alone or in combination with various flavoring powders) to the susceptor-bearing food surface, for example, by dusting. The contact between the separately applied browning reagents and the susceptor is intimate, and the reagents in effect become part of the susceptor with no air gap therebetween. Thus, in this case too, browning can be obtained with the susceptor only at the Maillard reaction temperature, although faster and more extensive browning may be obtained with the susceptor at higher temperatures.

After application of the susceptor, the susceptor-bearing food may be refrigerated, frozen, or directly microwaved cooked. Where browning is desired, the cooking time should be sufficient to enable the susceptor to heat to the Maillard reaction temperature and the Maillard reaction to proceed sufficiently for the development of a desirable level of browning. Generally a microwave cooking time of at least 120 seconds is sufficient for this purpose, although in particular applications shorter or longer times may be preferable.

It will be appreciated that because the susceptor remains on the surface of the food and will be eaten with the food, various restrictions are imposed therein which might not be imposed upon a susceptor which is external or separated from the food prior to eating of the food. Thus, in the present susceptor, the chloride salt is preferably all sodium chloride, or at least a mixture of sodium and potassium chlorides, rather than all potassium chloride, as the latter is somewhat unpalatable. Similarly, while propylene glycol may have some beneficial effect as a lossiness enhancer for an external susceptor, it is preferably avoided in the present susceptor since it is rather unpalatable. Similarly, carboxymethylcellulose (CMC) is preferably not used in the present susceptor because it emits a detectable burning smell.

The preferred composition of a browning susceptor according to the present invention is set forth in Table I below.

TABLE I

| Ingredients | Range % (w/w) | Preferred % (w/w) |
|---|---|---|
| Glycerine | 65–80 | 72 |
| Sucrose ester | 2–10 | 5 |
| Chloride salt (NaCl) | 0.5–4.0 | 3 |
| Amino compound (L-Lysine HCl) | 1–15 | 7 |
| Reducing sugar (Fructose or Dextrose) | 5–20 | 13 |
| Flavoring | 0.5–5.0 | — |

EXAMPLES

Example 1

To illustrate the utility of the process of the present invention in obtaining a browning reaction on a variety of different foodstuffs and the use of a natural skin as a barrier layer, chicken, potato, and beef foodstuffs were prepared, cooked and tested as presented below in TABLE II: CHICKEN and TABLE III: POTATO AND BEEF. The chicken foodstuff was tumbled to obtain an 18% water gain and then provided with the aforementioned coating, as described in the commonly owned copending U.S. patent application. The potato foodstuff was comprised of four fresh-cut potato slices having a thickness of 0.5–0.7 cm, and the beef foodstuff was in 2 ×4 ×0.5 inch chunks. The beef foodstuffs were coated (without tumbling) with the same coating used on the chicken foodstuff. The potato slices were coated (without tumbling) on one side with a very thin layer of the same coating (less than 1 gram total of coating).

TABLE II

| CHICKEN | |
|---|---|
| Control: | chicken part (breast) without skin and without edible film. |
| Sample No. 1: | chicken part (breast) without skin but with edible film. |
| Sample No. 2: | chicken part (thigh) with skin and edible film. |
| Sample No. 3: | chicken part (thigh) with skin but without edible film. |

| Sample No. | Control | 1 | 2 | 3 |
|---|---|---|---|---|
| Chicken Type | Breast (No Skin) | Breast (No Skin) | Thigh (Skin) | Thigh (Skin) |
| Initial Weight (g) (after tumbling) | 133.8 | 124.3 | 190.2 | 174.9 |
| Weight with Coating (g) | 140.5 | 129.9 | 196.6 | 181.5 |
| Weight with Edible Film (With/Without) & Semi-liquid Susceptor (g) | 145.1 (No Film) | 135.0 (Film) | 200.8 (Film) | 186.3 (No Film) |
| MW Cooking Time (min) (650 Watts) | 3.5 | 2.5 | 4.0 | 3.5 |
| Weight After Cooking (g) | 115.8 | 101.6 | 147.9 | 134.8 |
| Color Developed | No Browning | Excell't Browning | Excell't Browning | Excell't Browning |
| Bumping | None | None | None | None |
| Moisture Loss (%)* | 20.2 | 24.7. | 26.4 | 27.5 |
| Tenderness & Juiciness | Yes | Yes | Yes | Yes |
| Crispiness | No | Slight | Somewhat | Somewhat |

*The moisture loss was calculated as the weight difference of chicken before and after microwave cooking divided by the weight before cooking.

TABLE III

| | POTATO AND BEEF | | | |
|---|---|---|---|---|
| Sample | Potato | Potato (Control) | Beef | Beef (Control) |
| Initial Wt. (g) | 152.5 | 171.2 | 120.9 | 125.8 |
| Weight With Coating | — | — | 127.3 | 132.4 |
| Weight With Film (With/Without) & Semi-liquid Susceptor (g) | 159.1 (Film) | 174.8 (No Film) | 133.4 (Film) | 138.2 (No film) |
| MW Cooking Time (min) (650 Watts) | 4.0 | 4.5 | 3.0 | 3.0 |
| Weight After Cooking (g) | 121.2 | 130.7 | 93.5 | 99.2 |
| Color Developed | Good Browning | No Browning | Good Browning | No Browning |
| Moisture Loss (%) | 23.8 | 25.2 | 30.0 | 21.1 |

While each of the three controls of Tables II and III exhibited no browning, good to excellent browning was obtained on each of the foodstuffs treated according to the process of the present invention.

A comparison of Sample No. 3 (chicken thigh with skin, but without edible barrier film) with Sample No. 2 (chicken thigh with skin and with edible barrier film) shows comparable results, thus illustrating that the natural chicken skin can serve the function of the applied edible barrier film.

Example 2

Frozen meat pies (such as the frozen "Jamaican Meat Pie" available from the Golden Dipt Company, MO) are produced by enrobing well-cooked and spiced ground meat with a raw dough sheet, and then forming the product into a desired shape such as a dumpling. While usually the meat pie will be further breaded and pre-fried, and then kept in a freezer for microwave reheating and serving, for the purposes of the present example, the pie was enrobed with a raw dough (without breading and without pre-frying) and the product was cooked in a household microwave oven (650 Watts) for three minutes. The product was either cooked directly (without any treatment according to the present invention) as a control, or after spraying of a susceptor according to the present invention on the dough surface.

After microwave heating, the pie according to the present invention had a brown and crispy surface, whereas the control did not show any browning at all (exhibiting an off-white color) and had a soggy texture.

To summarize, the present invention provides a microwave cooking process which simulates frying to produce food having a crisp exterior and a soft, tender interior. In a preferred embodiment, the process browns the food exterior through a true Maillard reaction. The process is safe and economical.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A fry-like microwave cooking process for producing food with a crisp exterior and a soft, tender interior, comprising the steps of:
   (A) applying an edible hydrophilic lossy susceptor to at least a portion of the surface of the food bearing a moisture-retardant edible barrier layer, the susceptor including glycerine, sucrose ester, and chloride salt, and being characterized by the property that 25 grams of the susceptor in a 50 ml. glass beaker is heatable to 200° C. in less than 40 seconds by 900 watts of heatable microwave energy in a 1.1 cu. ft. oven; and
   (B) microwave cooking the susceptor-bearing food to provide a crisp exterior and a soft, tender interior for the food.

2. The process of claim 1 which further browns and crisps the food exterior through a Maillard reaction at a temperature of at least 135° C., the susceptor additionally including a reducing sugar and an amino compound.

3. The process of claim 2 wherein the reducing sugar is selected from the group consisting of dextrose, fructose, galactose, and combinations thereof, and the amino compound is selected from the group consisting of an amino acid, a polypeptide and combinations thereof.

4. The process of claim 1 wherein the food initially has a moisture content of at least 45% by weight.

5. The process of claim 1 wherein the barrier layer is a film applied to a thickness of 20-50 microns.

6. The process of claim 5 wherein the microwave cooking of the susceptor-bearing food eventually causes visual disappearance of the barrier film.

7. The process of claim 1 wherein the susceptor includes a viscosity adjuster.

8. The process of claim 1 wherein the susceptor is applied to the barrier-bearing surface by spraying or painting.

9. The process of claim 1 wherein the barrier layer protects the susceptor from the moisture escaping the food during microwave cooking for sufficient time for the susceptor temperature to reach a Maillard reaction temperature.

10. The process of claim 1 wherein the barrier layer covers at least 10% of the food surface, and the susceptor substantially covers the barrier-layer surface.

11. The process of claim 1 wherein the chloride salt is selected from the group consisting of sodium chloride and potassium chloride, and combination thereof.

12. The process of claim 1 wherein the sucrose ester is selected from the group consisting of behenate, stearate, oleate, palmitate, myristate, and laurate esters and combinations thereof.

13. The process of claim 1 wherein the susceptor includes 2-10% sucrose ester and less than 4% chloride salt, based on the weight of the susceptor.

14. The process of claim 1 wherein the susceptor additionally includes an acidic polysaccharide gum selected from the group consisting of Karaya gum, Ghatti gum, Tragacanth gum, and combinations thereof.

15. The process of claim 14 wherein the susceptor additionally includes 4-8% acidic polysaccharide gum, based on the weight of the susceptor.

16. The process of claim 1 wherein the susceptor additionally includes a viscosity modifier selected from the group consisting of gelatin, pectin, sodium carboxymethyl-cellulose, and combinations thereof, thereby to provide a desirable viscosity for application of the susceptor.

17. The process of claim 1 wherein the barrier layer is selected from the group consisting of a natural skin, a dough layer, a film formed of a plasticized material selected from the groups consisting of methylcellulose, carrageenan and combinations thereof, and combinations thereof.

18. The process of claim 17 wherein the barrier layer is natural skin.

19. The process of claim 17 including the step of initially applying to at least a portion of the surface of the food a dough layer as the barrier layer.

20. The process of claim 18 including the step of initially applying to at least a portion of the surface of the food a film as the barrier layer.

21. A fry-like microwave cooking process for producing food with a crisp browned exterior and a soft, tender interior, comprising the steps of:

(A) providing a food having a moisture content of at least 45% by weight and on at least 10% of the surface thereof having a moisture-retardant edible barrier layer selected from the group consisting of a natural skin, a dough layer, a film formed of a plasticized material selected from the group consisting of methylcellulose, carrangeenan and combinations thereof;

(B) applying to at least a portion of the barrier-bearing surface of the food a food grade, hydrophilic lossy susceptor, the susceptor including glycerine, 2-10% sucrose ester selected from the group consisting of behenate, stearate, oleate, palmitate, myristate, and laurate esters and combinations thereof, based on the weight of the susceptor, less than 4% chloride salt selected from the group consisting of sodium chloride and potassium chloride, and combinations thereof, an acidic polysaccharide gum selected from the group consisting of Kayara gum, Ghatti gum, Tragacanth gum, and combinations thereof, a viscosity modifier selected from the group consisting of gelatin, pectin, sodium carboxymethylcellulose, and combinations thereof, thereby to provide a desirable viscosity for application of the susceptor, and a reducing sugar and an amino compound to participate in a Maillard reaction, the susceptor being characterized by the property that 25 grams of the susceptor in a 50 ml. glass beaker is heatable to 200° C. in less than 40 seconds by 900 watts of heatable microwave energy in a 1.1 cu. ft. oven so as to brown the food exterior through a Maillard reaction; and (C) microwave cooking the susceptor-bearing food to provide a crisp exterior and a soft, tender interior for the food.

22. The process of claim 21 wherein the barrier layer protects the susceptor from the moisture escaping the food during microwave cooking for sufficient time for the susceptor temperature to reach a Maillard reaction temperature.

23. The process of claim 21 wherein said amino compound is selected from the group consisting of amino acids, polypeptides, and combinations thereof.

24. The process of claim 23 wherein said amino acid is selected from the group consisting of lysine, glutaminic acid, cystine, and combinations thereof.

25. The process of claim 23 wherein said polypeptide is a protein hydrolysate.

* * * * *